United States Patent Office.

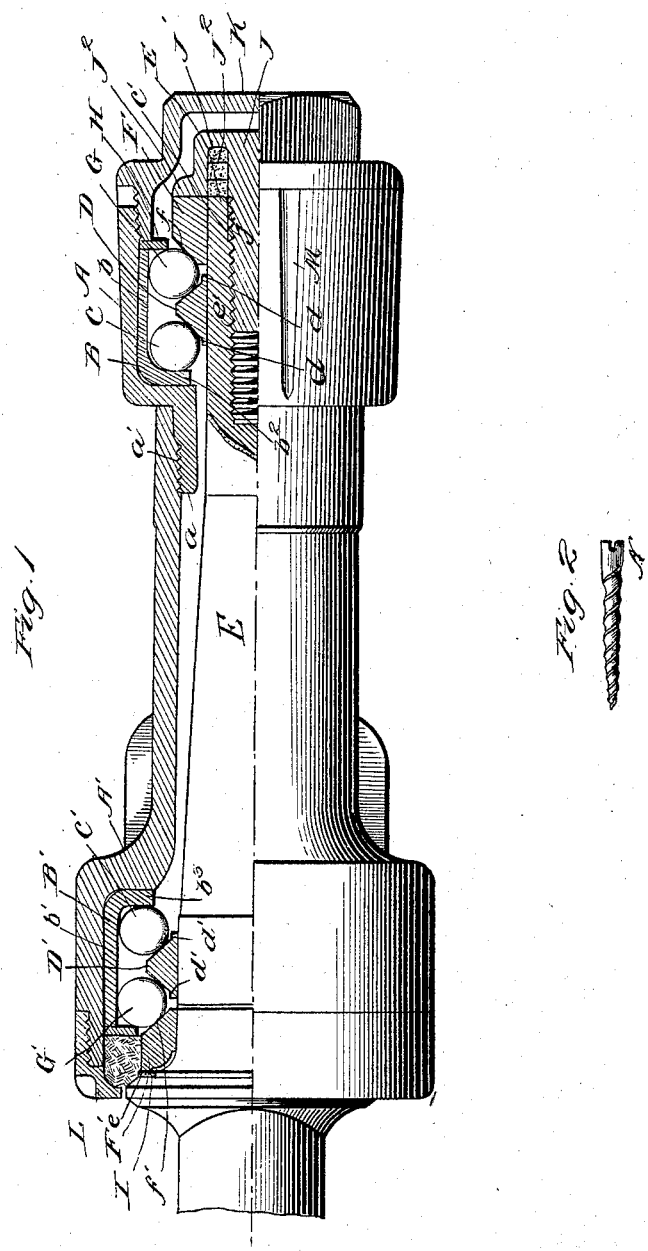

WALTER C. BAKER, OF CLEVELAND, OHIO, ASSIGNOR TO THE AMERICAN BALL BEARING COMPANY, OF SAME PLACE.

ANTIFRICTION-BEARING.

SPECIFICATION forming part of Letters Patent No. 608,017, dated July 26, 1898.

Application filed December 3, 1897. Serial No. 660,570. (No model.)

*To all whom it may concern:*

Be it known that I, WALTER C. BAKER, of Cleveland, Cuyahoga county, Ohio, have invented certain new and useful Improvements in Antifriction-Bearings; and I do hereby declare the following to be a full, clear, and exact description of the invention, such as will enable others skilled in the art to which it pertains to make and use the same.

My invention relates to antifriction-bearings, and more especially to such as are used in connection with the wheels and axles of vehicles.

The characteristic features of my invention will be fully described hereinafter, and defined in the appended claims.

In the drawings, Figure I is a view in side elevation, half-section, of a bearing constructed according to my invention. Fig. II illustrates one construction of key for securing the bushing to the hub.

Referring to the drawings, A A' represent the sleeve of the bearing, which in the construction illustrated forms the bushing for the wheel-hub, and hence is formed in two sections united by means of male and female screw-threads $a$ $a'$, cut on the respective sections A and A'. In the construction illustrated the male thread is formed on the section A, and the female thread in the section A'.

B B' represent hard-metal flanged ball-cups, one, B, being set in the interior of the section A, and the other, B', is set in the bearing-chamber of the section A'. Each of the ball-cups B and B' have their longitudinal flanges $b$ $b'$ formed deep enough or long enough to provide a bearing for at least two rows of balls, as illustrated in the drawings. The vertical annular flanges $b^2$ $b^3$ of the ball-cups provide the end-thrust bearing for the inner row of balls C and C'. The ball-cups B and B' fit snugly in their respective seats, but in such a manner that they can be removed and replaced without any special tool or effort.

D and D' represent two annular cones, which surround the axle E and fit the same snugly; but at the same time the fit is such as to allow of the cones D and D' being adjusted horizontally along the axle and also allow the said cones to turn on the axle, as will hereinafter appear. The opposite faces of the cones D and D' are approximately at an angle of ninety degrees to each other and at or about an angle of forty-five degrees to the base or inner portion or face of the annular cones. At or near the base of each of the cones D and D', I provide two annular ledges or flanges $d$ $d$ and $d'$ $d'$, which extend out at each side of the cones approximately parallel to the base or inner face of the cone and provide a broader bearing both for the cones in relation to the axle and also for the balls bearing on the inclined faces of the cones and also act to retain the balls in place when the wheel is separated from the axle.

F F' represent two bearing rings or cones having each an inclined bearing-face $f$ and $f'$. The bearing-rings F and F' are mounted on the axle E snugly, but at the same time in such a manner as to allow of both horizontal movement along the axle and also of rotary movement around the same. The inclined faces $f$ and $f'$, respectively, of the rings F and F' act, in conjunction with one of the inclined faces of the cones D and D', to form an adjustable bearing or race for a row of antifriction-balls G or G', respectively, as illustrated, and hence it will be seen that the whole bearing and wearing of the device is sustained by the ball-cups B and B', the cones D and D', the bearing rings or cones F and F', and the four rows of balls C C' G G', and inasmuch as all these parts are easily removed they may all be replaced when worn or any of them can be replaced, at option.

H and H' represent two retaining-rings which are forced in the bearing-chambers of the sections A and A', respectively, so as to retain the balls and bearing-cones in place while the bearing is handled and placed on the axle.

I represents a leather washer placed between the rear end of bearing-ring F' and the shoulder $e$ of the axle E, acting as a cushion between the parts.

J represents the retaining and adjusting screw, which is provided with an external or male screw-thread $j$, which engages a corresponding female-screw-threaded orifice $e'$, formed in the end of the axle E. The head of the retaining and adjusting screw J is provided with an annular recess J', which is of sufficient area to receive the end E' of the axle. The outer annular flange J² of screw J thus formed engages the bearing-ring F, and thus as the screw J is screwed or turned in the bearing rings, cones, and balls are adjusted in relation one to the other and to the ball-cups through the sleeve A A', which is loosely mounted around the axle and free to move in a horizontal direction in relation to said axle, and thus it will be seen that the one mechanical action of manipulating the screw J will adjust the bearing as a whole along its entire bearing-surfaces, or, in other words, the loosening or tightening of screw J will loosen or tighten the cones and balls in their relation to each other.

In order to lock the screw J when it is properly adjusted, I fill the recess J' with leather washers j², or washers of like character, which by frictional engagement with the end E' of the axle and the elasticity or cushioning action of the washers keep the screw J from turning by the action of the bearing or from the jarring of the parts during use and also allow of the finer adjustment of the said screw J in relation to the bearing and axle, and hence a finer adjustment of the bearing parts, (cones and balls.)

K represents the dust-cap, which is secured to section A of the axle by suitable screw-threads, male and female, provided on the respective parts.

L represents a dust collar or ring which is internally screw-threaded and engages an external screw-thread formed on the end of section A' of the sleeve. By forming the dust collar or ring L with internal screw-threads and securing it to section A', as illustrated and described, I am enabled to locate the balls and cones, or, more properly speaking, the bearings of the sections A A', farther from each other than I could were the collar L externally screw-threaded and engaging an internal screw-thread formed in the end of the section A', inasmuch as by my construction the internal space is not interfered with or taken up by the securing of the dust-collar L. This is an important feature, because the farther from each other the bearings in the sections A and A' are the less the strain will be when the vehicle makes a turn from side to side.

M represents a groove or key-seat which is formed on the periphery of section A. This groove or seat M is intended to receive a key, screw, or like device N, (see Fig. II,) which also engages with the hub of the wheel, and thus keeps the said section from turning when the dust-cap is removed, which would result in separating the sections and misadjusting the parts. As the threads of the screw N engage the wood of the hub opposite the seat or grove M, it is unnecessary to form threads on said seat.

As hereinbefore stated, the bearing-cones D D' and F F' are so secured to the axle E as to be free to revolve around the same in place of being secured to the axle and free to move in a horizontal direction only. The object of this is to allow the said cones to present new bearing-surfaces to that part of the bearing which receives the greatest stress. This presenting of the new surface in cases where the cones are free to revolve around the axle is accomplished by the movement of said rings by the jarring of the parts when the bearing is in use, and thus an equal wearing of the parts is obtained.

What I claim is—

1. In an antifriction-bearing, the combination with an axle or journal, of a sleeve or casing provided at its ends with annular chambers, adjustable bearing-rings arranged on the axle or journal within each of said chambers, one of said rings in each chamber having opposite cone-surfaces, balls bearing against said cone-surfaces, means for securing the balls in position, and means for simultaneously adjusting the sleeve, bearing-rings and balls, by a single mechanical action.

2. An antifriction-bearing comprising an axle or journal provided at its front end with an internal-screw-threaded orifice, and suitble cones and balls for forming antifriction-bearings, and a securing and adjusting screw engaging the internal-screw-threaded orifice in the end of the axle or journal, said screw having a recessed head and washers located therein, all operating substantially as shown and described.

3. In an antifriction-bearing, the combination with an axle or journal, of a sleeve or casing surrounding the axle, and provided at its ends with annular chambers, a plurality of bearing-rings adjustably secured upon the axle, within each of said chambers, one bearing-ring in each chamber having opposite cone-surfaces, balls bearing against said rings, and an adjusting device at the outer end of the axle for simultaneously adjusting said sleeve and all of said bearing-rings and balls.

4. In an antifriction-bearing, the combination with an axle or journal, of a sleeve or casing surrounding the axle, and provided at each of its ends with annular bearing-chambers, bearing-rings arranged within each of said chambers, adjustable on said axle and provided on each side with an annular flange or extension, balls in contact with the opposite surfaces of the rings having said flanges, and means for adjusting said sleeve, rings, and balls by a single mechanical action.

5. In an antifriction-bearing, the combination with an axle or journal, of a sleeve provided on its peripheral surface with a longitudinal key seat or groove, and a screw-key adapted to enter said groove to prevent rotation of the sleeve independently of the hub, the threads of said screw-key adapted to engage the wood of the hub.

6. In an antifriction-bearing, the combination with an axle or journal provided at its outer end with a threaded recess, of a sleeve or casing, adjustable cone-rings and antifriction-balls, an adjusting-screw entering the recessed ends of the axle and provided with a flanged head, and yielding washers interposed between the screw-head and the outer end of the axle.

7. In an antifriction-bearing, the combination with the axle and two-part sleeve or casing, provided with a bearing-chamber at each end, of a plurality of adjustable cone-rings on the axle within each of said chambers, antifriction-balls bearing against said rings, one of said rings at each end of the sleeve having annular extensions which support the balls and prevent their dropping out when the wheel is removed from the axle.

8. In an antifriction-bearing, the combination with an axle, a casing or sleeve surrounding the same, bearing-rings and balls, of an adjusting-screw for adjusting said sleeve, bearing-rings, and balls, by a single mechanical action, and means interposed between the outer end of the axle and said adjusting-screw for obtaining a variable adjustment, and at the same time locking the adjusting-screw.

In testimony whereof I sign this specification, in the presence of two witnesses, this 10th day of November, 1897.

WALTER C. BAKER.

Witnesses:
W. E. DONNELLY,
ELLA E. TILDEN.